United States Patent
Zhao

(10) Patent No.: US 12,039,353 B2
(45) Date of Patent: Jul. 16, 2024

(54) APPLICATION PROCESSING METHOD, APPARATUS, DEVICE, AND MEDIUM

(71) Applicant: Tencent Technology (Shenzhen) Company Limited, Shenzhen (CN)

(72) Inventor: Shuyu Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 119 days.

(21) Appl. No.: 17/731,165

(22) Filed: Apr. 27, 2022

(65) Prior Publication Data

US 2022/0253325 A1  Aug. 11, 2022

Related U.S. Application Data

(63) Continuation of application No. PCT/CN2021/095992, filed on May 26, 2021.

(30) Foreign Application Priority Data

Jul. 21, 2020  (CN) .......................... 202010704842.0

(51) Int. Cl.
G06F 9/455  (2018.01)
G06F 8/41  (2018.01)
(Continued)

(52) U.S. Cl.
CPC ............ *G06F 9/45508* (2013.01); *G06F 8/41* (2013.01); *G06F 8/61* (2013.01); *G06F 8/65* (2013.01)

(58) Field of Classification Search
CPC .......... G06F 9/45508; G06F 8/41; G06F 8/61; G06F 8/65; G06F 8/443; G06F 8/30; G06F 8/71
(Continued)

(56) References Cited

U.S. PATENT DOCUMENTS 7,895,580 B1 *  2/2011  Nikolov .............. G06F 11/3624
717/130
9,135,418 B2 *  9/2015  Wade .................. H04W 12/086
(Continued)

FOREIGN PATENT DOCUMENTS

| CN | 105915623 A | 8/2016 |
|---|---|---|
| CN | 108804688 A | 11/2018 |
| CN | 110147239 A | 8/2019 |

OTHER PUBLICATIONS

Kazi, Iffat H., et al. "Techniques for obtaining high performance in Java programs." ACM Computing Surveys (CSUR) 32.3 (2000): pp. 213-240. (Year: 2000).*
(Continued)

*Primary Examiner* — Satish Rampuria
(74) *Attorney, Agent, or Firm* — Morgan, Lewis & Bockius LLP

(57) ABSTRACT

A computer system obtains a to-be-processed bytecode file from an archive file of a target application. The archive file is used for creating or updating an installation package of the target application. The computer system collects, from the to-be-processed bytecode file, bytecodes that correspond to N optimization tasks respectively, wherein N being a positive integer. One optimization task is used for optimizing one type of bytecode. The computer system performs an
(Continued)

optimization operation on the collected bytecodes that correspond to the optimization tasks respectively, so as to obtain an optimized bytecode file.

18 Claims, 7 Drawing Sheets

(51) Int. Cl.
*G06F 8/61* (2018.01)
*G06F 8/65* (2018.01)

(58) Field of Classification Search
USPC .................................................. 717/101–168
See application file for complete search history.

(56) References Cited

U.S. PATENT DOCUMENTS

| | | | | |
|---|---|---|---|---|
| 9,766,867 | B2* | 9/2017 | Yang | G06F 8/447 |
| 10,977,059 | B1* | 4/2021 | Douglas | G06F 9/44589 |
| 10,990,504 | B2* | 4/2021 | Raviv | G06F 21/6254 |
| 2003/0177480 | A1* | 9/2003 | Arkwright | G06F 9/45516 |
| | | | | 717/148 |
| 2004/0039926 | A1* | 2/2004 | Lambert | G06F 21/125 |
| | | | | 713/189 |
| 2008/0222624 | A1* | 9/2008 | Mausolf | G06F 9/445 |
| | | | | 717/166 |
| 2019/0303847 | A1 | 10/2019 | Padgett et al. | |

OTHER PUBLICATIONS

Singh, Sachchidanand. "Optimize cloud computations using edge computing." 2017 International Conference on Big Data, IOT and Data Science (BID). IEEE, 2017.pp. 49-53 (Year: 2017).*

Chen, Xiao, et al. "Android HIV: A study of repackaging malware for evading machine-learning detection." IEEE Transactions on Information Forensics and Security 15 (2019): pp. 987-1001. (Year: 2019).*

Vidas, Timothy, et al. "A5: Automated analysis of adversarial android applications." Proceedings of the 4th ACM Workshop on Security and Privacy in Smartphones & Mobile Devices. 2014.pp. 39-50 (Year: 2014).*

Dufour, Bruno, et al. "Dynamic metrics for Java." Proceedings of the 18th annual ACM SIGPLAN conference on Object-oriented programing, systems, languages, and applications. 2003.pp. 149-168 (Year: 2003).*

Bruce, Bobby R., et al. "Approximate oracles and synergy in software energy search spaces." IEEE Transactions on Software Engineering 45.11 (2018): pp. 1150-1169. (Year: 2018).*

Tencent Technology, WO, PCT/CN2021/095992, Aug. 27, 2021, 3 pgs.

Tencent Technology, IPRP, PCT/CN2021/095992, Jan. 24, 2023, 4 pgs.

Tencent Technology, ISR, PCT/CN2021/095992, Aug. 27, 2021, 2 pgs.

* cited by examiner

APPLICATION PROCESSING METHOD, APPARATUS, DEVICE, AND MEDIUM

CROSS-REFERENCE TO RELATED APPLICATIONS

This application is a continuation application of PCT Patent Application No. PCT/CN2021/095992, entitled "APPLICATION PROCESSING METHOD, APPARATUS AND DEVICE, AND MEDIUM" filed on May 26, 2021, which claims priority to Chinese Patent Application No. 202010704842.0, filed with the State Intellectual Property Office of the People's Republic of China on Jul. 21, 2020, and entitled "APPLICATION PROCESSING METHOD, APPARATUS, DEVICE, AND MEDIUM", all of which are incorporated herein by reference in their entirety.

FIELD OF THE TECHNOLOGY

This application relates to the field of computer technology, and in particular, to an application processing method, an application processing apparatus, an application processing device, and a computer-readable storage medium.

BACKGROUND OF THE DISCLOSURE

With the progress of computer technology, a massive number of applications have emerged on various application platforms. The iterative development of an applications leads to continued increase in the size of an installation package of the application. On the one hand, the size of the installation package is closely related to the download and conversion rate. The larger the installation package of the application, the lower the download and conversion rate of the application. On the other hand, the size of the installation package of the application also affects the promotion of the application greatly. For example, an Android (Android is a mobile operating system) application platform stipulates that an application installation package larger than 100 megabytes is not allowed to be uploaded except in the form of an extended file. Under such stipulation, the large size of the application is detrimental to the promotion of the application. Evidently, during creation or iteration of the application installation package, the size of the installation package needs to be strictly controlled. Currently, the size of the installation package is primarily controlled by obfuscating and compressing the installation package of the application.

SUMMARY

Embodiments of this application provide an application processing method, apparatus, and device, and a computer-readable storage medium to implement apposite compression to a great extent and ensure compatibility and stability.

According to an aspect, an embodiment of this application provides an application processing method. The method includes:
  obtaining a to-be-processed bytecode file from an archive file of a target application, the archive file being used for creating or updating an installation package of the target application;
  traversing the to-be-processed bytecode file to collect bytecodes that correspond to N optimization tasks respectively, N being a positive integer, and one optimization task being used for optimizing one type of bytecode; and
  performing an optimization operation on the collected bytecodes that correspond to the optimization tasks respectively, so as to obtain an optimized bytecode file.

According to an aspect, this application provides an application processing apparatus. The apparatus includes:
  an obtaining unit, configured to obtain a to-be-processed bytecode file from an archive file of a target application, the archive file being used for creating or updating an installation package of the target application; and
  a processing unit, configured to traverse the to-be-processed bytecode file to collect bytecodes that correspond to N optimization tasks respectively, N being a positive integer, and one optimization task being used for optimizing one type of bytecode; and configured to perform an optimization operation on the collected bytecodes that correspond to the optimization tasks respectively, so as to obtain an optimized bytecode file.

According to an aspect, this application provides an application processing device (e.g., an electronic device, a computer system, etc.). The device includes:
  a processor, configured to execute a computer program; and
  a computer-readable storage medium, storing a computer program; when executed by the processor, the computer program implementing the application processing method described above.

According to an aspect, this application provides a non-transitory computer-readable storage medium, storing a computer program. The computer program is configured to be loaded by a processor to implement the application processing method described above.

According to an aspect, this application provides a computer program product or a computer program. The computer program product or the computer program includes a computer instruction. The computer instruction is stored in a computer-readable storage medium. A processor of a computer device reads the computer instruction in the computer-readable storage medium. The processor executes the computer instruction to cause the computer device to perform the application processing method described above.

BRIEF DESCRIPTION OF THE DRAWINGS

To describe the technical solutions in the embodiments of this application more clearly, the following outlines the drawings to be used in the description of the embodiments of this application or the related art. Evidently, the drawings outlined below are merely a part of embodiments of this application, and a person of ordinary skill in the art may derive other drawings from the outlined drawings without making any creative effort.

DESCRIPTION OF EMBODIMENTS

The following describes technical solutions in the embodiments of this application with reference to drawings.

An application installation package is a self-extracting archive that includes all the files required for installing an application. By running the application installation package, all the files of the application are extracted to a hard disk of a computer device to perform such tasks as modifying a registry, modifying system settings, and creating a shortcut. In this way, the computer device can use functions of the application. The format of the application installation package varies depending on an installation environment of the application. The term "installation environment" herein is an operating system environment of the computer device. For example, an application installation package in an Android (a mobile operating system) environment is in an Android application package (APK) format, and an application installation package in an iOS (a mobile operating system) environment is in an iPhone Application (IPA) format. In the subsequent description of embodiments of this application, the APK installation package is used as an example.

Figure 1A:
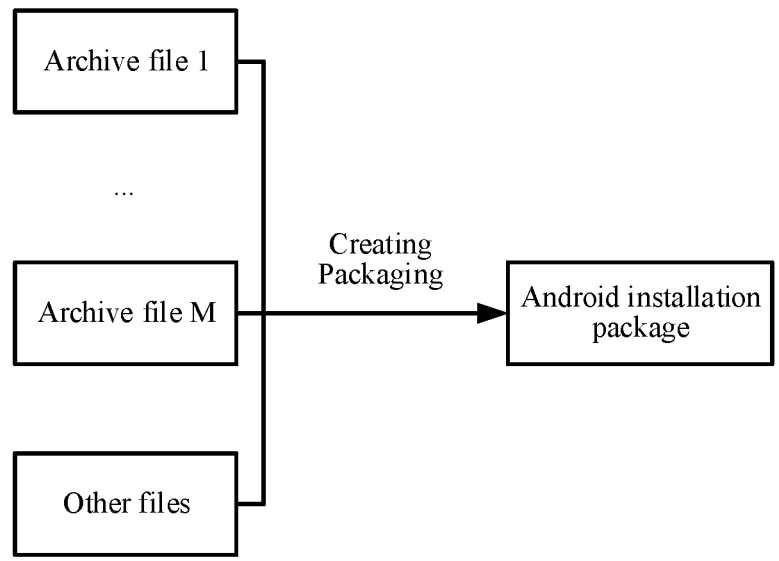
FIG. 1A is a schematic diagram of files required for creating an application installation package according to an exemplary embodiment of this application.
Figure 1B:
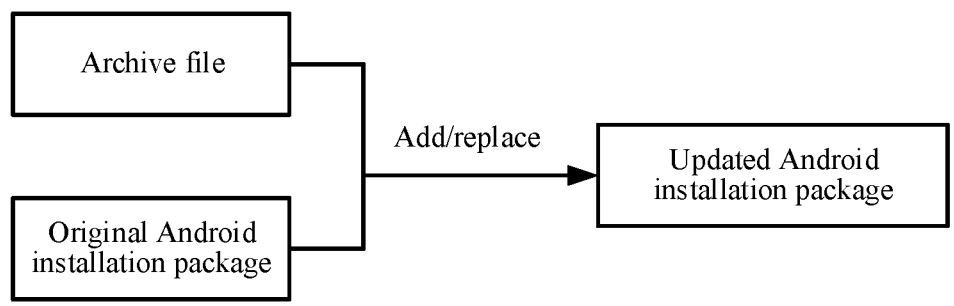
FIG. 1B is a schematic diagram of files required for updating an application installation package according to an exemplary embodiment of this application.

An archive file of the application is a file used for aggregating a class file, metadata (that is, data used for describing attributes), and resources (such as text and pictures) of the application. The archive file may be used for creating an installation package of the application, or for updating the installation package of the application. FIG. 1A is a schematic diagram of files required for creating an application installation package according to an exemplary embodiment of this application. The application installation package shown in FIG. 1A is in an APK format. The archive file of the APK is a Jar package. As shown in FIG. 1A, the APK is created by packaging M archive files (Jar packages) and other files (such as entry files), where M is a positive integer. FIG. 1B is a schematic diagram of files required for updating an application installation package according to an exemplary embodiment of this application. In FIG. 1B, the updated APK is obtained by replacing an old archive file in an original APK with a new archive file, or by adding a new archive file as an additional file into the original APK. Evidently, the archive file is required for both creating and updating an application installation package. The archive file of the application includes a class file. The class file is a binary file with a suffix ".class" and is generated after a compiler compiles a source file of the application. The class file is convertible into a bytecode file. The bytecode file is a binary file that includes an executable program and that is formed by a sequence of opcode or data pairs. The bytecode file is a file preprocessed by the compiler, and is a form of existence of the executable file of the application.

The size of the application installation package is closely related to the download and conversion rate, and also exerts a considerable impact on the promotion of the application. Therefore, the size of the installation package needs to be strictly controlled during creation or iteration of the application installation package. In view of the situation above, an embodiment of this application discloses an application processing solution. The solution can effectively compress an application installation package. The solution possesses the following characteristics: (1) The solution is designed to be universally applicable, scalable, and of high performance. Universal applicability means: all applications are supported to quickly and easily access this solution to achieve the objective of compressing an installation package. Scalability means: the solution is scalable to support new optimization forms and quickly accessible to the new optimization forms, and the solution enhances bytecode compression capabilities continuously by being adaptable to more optimization forms continuously. High performance means: the solution is applied to a process of creating an application installation package, and the increment of compiling time is minimized after the solution is applied to the process of creating the application installation package. (2) The solution can be applied as a plug-in to the process of creating an application installation package. An obfuscation task or a Jar file merging (JarMerge) task of the application installation package is hooked during the creation of the package. An archive file outputted by the obfuscation task or JarMerge task is collected, and a bytecode file in the archive file is optimized appositely to a maximum extent to downsize the bytecode file, thereby helping to downsize the updated or created installation package of the target application, and achieving high compatibility and stability. The bytecode file can be optimized by using a plug-in in a creation script of the application, thereby ensuring universality of the optimization solution. (3) The number of optimization tasks for the bytecode file is user-definable, and additional optimization tasks can be added to keep enhancing capabilities of compressing and optimizing the bytecode file, and to further control the size of the updated or created installation package of the target application.

In this embodiment of this application, the term "archive file" is a file used for updating and replacing the installation package of the target application, or a file used for creating the installation package of the target application. This embodiment of this application is dedicated to optimizing the bytecode file corresponding to the archive file of the target application in a plurality of dimensions. An exemplary optimization process is: First, obtaining a to-be-processed bytecode file from the archive file of the target application, and setting N optimization tasks as needed; then collecting, from the to-be-processed bytecode file, bytecodes that correspond to the N optimization tasks respectively, and then performing an optimization operation on the collected bytecodes that correspond to the optimization tasks respectively, so as to obtain an optimized bytecode file. Through the foregoing process, the bytecode file in the archive file included in the installation package of the target application is optimized appositely to a maximum extent to downsize the bytecode file, thereby helping to downsize the updated or created installation package of the target application, and achieving high compatibility and stability. In addition, the number of optimization tasks is user-definable, and additional optimization tasks can be added to keep enhancing capabilities of compressing and optimizing the bytecode file, and to further control the size of the updated or created installation package of the target application.

Figure 1C:
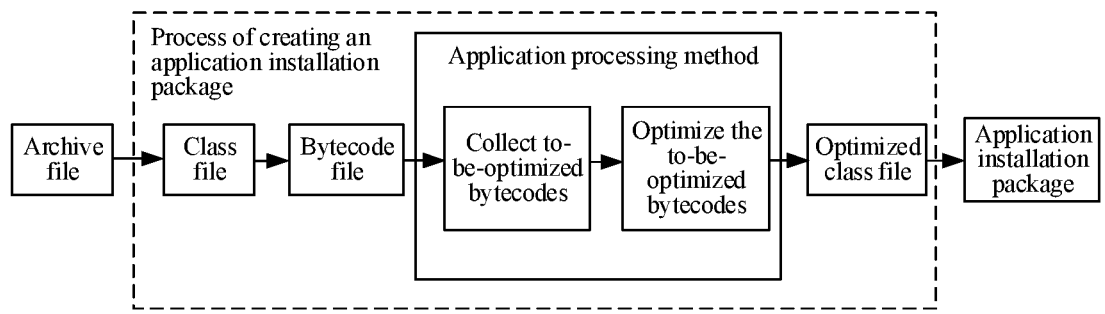
FIG. 1C shows a process of creating an application installation package according to an exemplary embodiment of this application.

FIG. 1C shows a process of creating an application installation package according to an exemplary embodiment of this application. As shown in FIG. 1C, an application processing method is designed for use in a process of creating an application installation package according to this embodiment of this application. The method primarily collects to-be-optimized bytecodes from the bytecode file of the application, and then optimizes (for example, deletes or replaces) the bytecodes to compress the application installation package. Similarly, during update of the application installation package, the bytecodes in the archive file included in the application installation package may be optimized by using the application processing method according to this application, so as to compress the application installation package. The application processing method is applicable to a terminal device or server. The terminal device includes but is not limited to computer devices such as a smartphone (such as Android phone and iOS phone), a tablet computer, a portable personal computer, and a mobile Internet device (MID for short). The server includes but is not limited to a cluster server. The types of the terminal device and the server are not limited herein.

In the process of creating an Android installation package shown in FIG. 1C, the application processing flow mainly includes: (1) obtaining a to-be-processed bytecode file from an archive file (jar package) of a target application; (2) traversing the to-be-processed bytecode file to collect bytecodes that correspond to N optimization tasks (the optimization tasks can include, for example, an annotation optimization task, a debugging information optimization task, and a global variable optimization task) respectively, where N is a positive integer. The value of N can be defined by the user. For example, N is 3, 5, or the like. With increase of the value of N, the optimization tasks are more comprehensive, and the bytecode file is compressed more effectively, but the optimization is more complex to implement, and consumes more time and resources; and (3) performing an optimization operation on the collected bytecodes that correspond to the optimization tasks respectively (for example, re-encoding a bytecode used for denoting a source file format, so as to obtain a simplified bytecode; and deleting debugging information indicated in optimization configuration information), so as to obtain an optimized bytecode file (that is, a compressed bytecode file).

Evidently, this embodiment of this application is dedicated to optimizing the bytecode file corresponding to the archive file in a plurality of dimensions. An exemplary optimization process is: First, obtaining a to-be-processed bytecode file from the archive file of the target application, and setting N optimization tasks as needed; then collecting, from the to-be-processed bytecode file, bytecodes that correspond to the N optimization tasks respectively, and then performing an optimization operation on the collected bytecodes that correspond to the optimization tasks respectively, so as to obtain an optimized bytecode file. Through the foregoing process, the bytecode file in the archive file included in the installation package of the target application is optimized appositely to a maximum extent to downsize the bytecode file. Both the update process and the creation process of the target application involve the archive file. Therefore, the multi-dimensional optimization for the bytecode file corresponding to the archive file is beneficial to downsizing the updated or created installation package of the target application, and helps to achieve high compatibility and stability. In addition, the number of optimization tasks is user-definable, and additional optimization tasks can be added to keep enhancing capabilities of compressing and optimizing the bytecode file, and to further control the size of the updated or created installation package of the target application.

Figure 2:
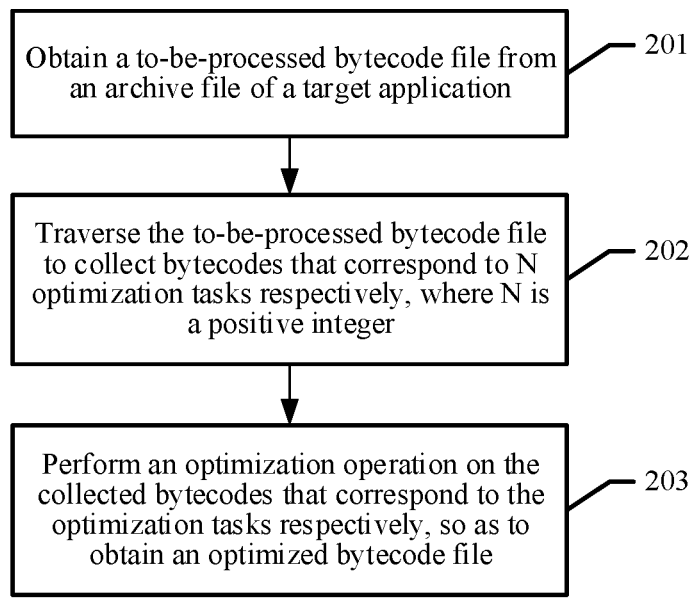
FIG. 2 is a flowchart of an application processing method according to an exemplary embodiment of this application.

FIG. 2 is a flowchart of another application processing method according to an exemplary embodiment of this application. As shown in FIG. 2, the application processing method includes, but is not limited to, the following step 201 to step 203. The following describes in detail an application processing method according to an embodiment of this application.

201. Obtain a to-be-processed bytecode file from an archive file of a target application.

The target application may be a browser application, a shopping application, a game application, or the like. In an embodiment, the application processing device decodes the archive file of the target application to obtain a class file of the target application, and then transcodes the class file to obtain a to-be-processed bytecode file of the target application.

202. Traverse the to-be-processed bytecode file to collect bytecodes that correspond to N optimization tasks respectively, where N is a positive integer.

One optimization task may be used for optimizing one type of bytecode. For example, an optimization task 1 may be used for optimizing a bytecode that denotes a system annotation, and an optimization task 2 may be used for optimizing a bytecode that denotes a source file format, and so on. The value of N is user-definable. For example, considering a balance between an compression effect of the bytecode file and resource consumption, the value of N is set to 5. For another example, to optimize 3 types of bytecodes in the bytecode file of the application, the value of N is set to 3. As can be seen from above, the application processing method according to this embodiment of this application is compatible with a plurality of optimization tasks, and can optimize a variety of bytecodes, thereby ensuring compatibility and scalability.

203. Perform an optimization operation on the collected bytecodes that correspond to the optimization tasks respectively, so as to obtain an optimized bytecode file.

The optimization operation includes, but is not limited to, modification and deletion. For example, the application processing device deletes a bytecode corresponding to an optimization task 1, and modifies a bytecode "cafe 01" corresponding to an optimization task 2 to "ba".

This embodiment of this application is dedicated to optimizing the bytecode file corresponding to the archive file in a plurality of dimensions. An exemplary optimization process is: First, obtaining a to-be-processed bytecode file from the archive file of the target application, and setting N optimization tasks as needed; then collecting, from the to-be-processed bytecode file, bytecodes that correspond to the N optimization tasks respectively, and then performing an optimization operation on the collected bytecodes that correspond to the optimization tasks respectively, so as to obtain an optimized bytecode file. Through the foregoing process, the bytecode file in the archive file included in the installation package of the target application is optimized appositely to a maximum extent to downsize the bytecode file. Both the update process and the creation process of the target application involve the archive file. Therefore, the multi-dimensional optimization for the bytecode file corresponding to the archive file is beneficial to downsizing the updated or created installation package of the target application, and helps to achieve high compatibility and stability. In addition, the number of optimization tasks is user-definable, and additional optimization tasks can be added to keep enhancing capabilities of compressing and optimizing the bytecode file, and to further control the size of the updated or created installation package of the target application.

Figure 3:
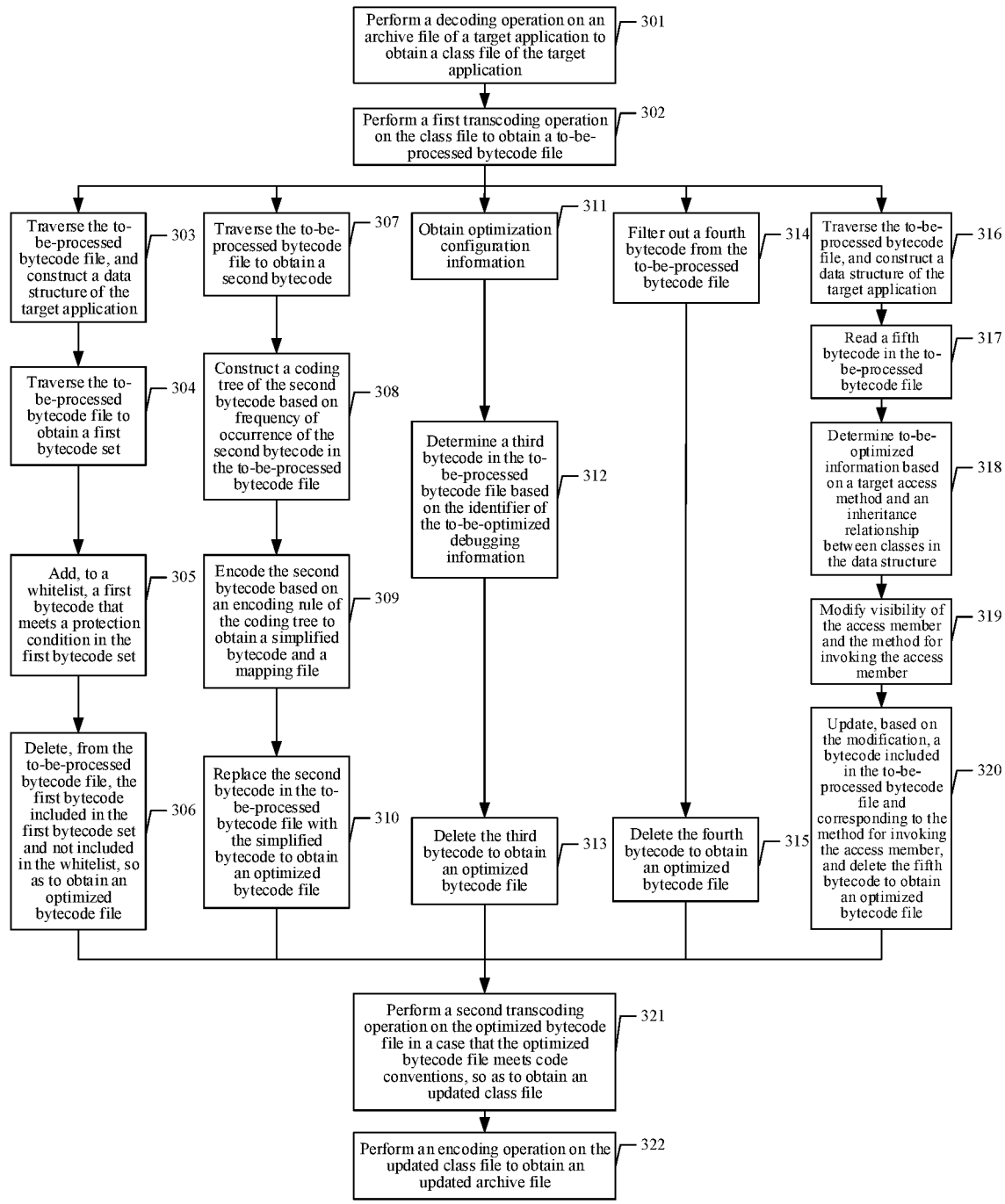
FIG. 3 is a flowchart of another application processing method according to an exemplary embodiment of this application.

FIG. 3 is a flowchart of another application processing method according to an exemplary embodiment of this application. As shown in FIG. 3, the application processing method includes, but is not limited to, the following step 301 to step 322. The following describes in detail an application processing method according to an embodiment of this application.

301. Perform a decoding operation on an archive file of a target application to obtain a class file of the target application. The target application includes a plurality of classes. A class is a cohesive package formed of specific metadata. Each class includes an interface and a structure. One or more classes are aggregated into a class file. The class file is a binary file with a suffix ".class" and is generated after a compiler compiles classes in a source file of the application.

302. Perform a first transcoding operation on the class file to obtain a to-be-processed bytecode file. The first transcoding operation mentioned herein is a process of converting the class file into a computer-identifiable to-be-processed bytecode file by using a compiler. The to-be-processed bytecode file is stored in an internal memory of an application processing device in the form of bytes.

303. Traverse the to-be-processed bytecode file, and construct a data structure of the target application.

In an embodiment, the application processing device traverses the to-be-processed bytecode file at least once, and parses the classes in the to-be-processed bytecode file and elements included in each class to obtain an inheritance relationship between the classes. The term "inheritance" means absorbing, by a new class, data attributes and behaviors of an existing class and acquiring new capabilities, where the new class is derived from the existing class. The existing class is referred to as a parent class, and the new class is referred to as a child class. The inheritance relationship is a parent-child relationship between the parent class and the child class. The inheritance relationship includes: inheriting, by the child class, characteristics and behaviors of the parent class so that a child-class object (instance) possesses attributes and methods of the parent class; or, inheriting, by the child class, methods from the parent class so that the child class possesses the same behaviors as the parent class. A data structure of the target application is constructed based on the inheritance relationship between the classes. The data structure includes the inheritance relationship between the classes in the target application. The data structure may include but is not limited to: an array structure, a tree structure, and the like. Using the tree structure as an example, the solution disclosed in this application can construct an inheritance tree that includes all classes based on the inheritance relationship between the classes in the target application.

304. Traverse the to-be-processed bytecode file to obtain a first bytecode set.

The first bytecode is a bytecode included in the to-be-processed bytecode file and used for denoting a system annotation. The system annotation is used for denoting all kinds of reflection information related to classes (and methods and fields). The system annotation may specifically include, but is not limited to: getEnclosingMethod, getSimpleName, isLocalOrAnonymousClass, getGenericSuperclass, and getTypeParameters.

305. Add, to a whitelist, a first bytecode that meets a protection condition in the first bytecode set.

Figure 4A:
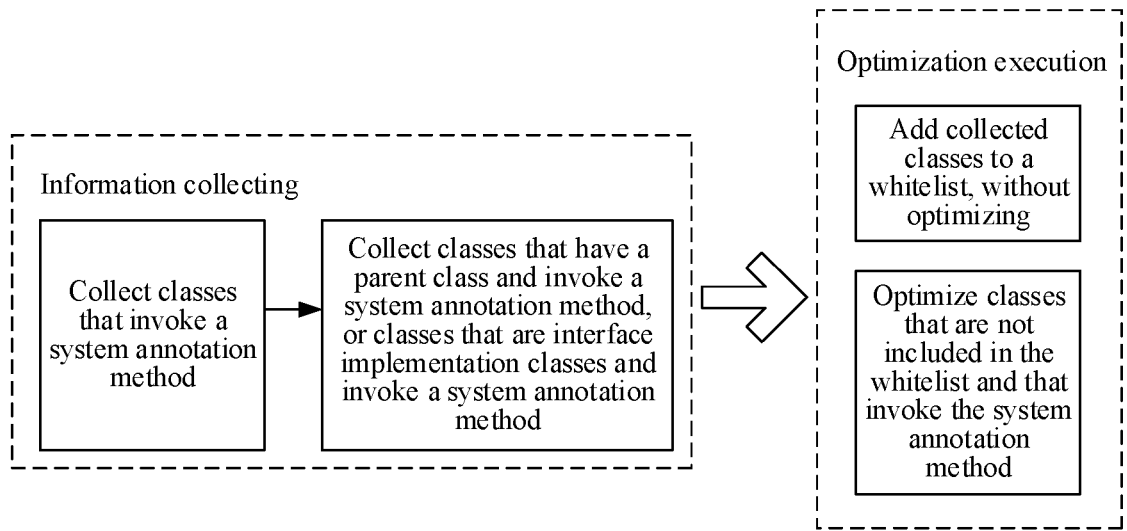
FIG. 4A is a flowchart of a system annotation optimization task according to an exemplary embodiment of this application.

FIG. 4A is a flowchart of a system annotation optimization task according to an exemplary embodiment of this application. As shown in FIG. 4A, the system annotation optimization task includes two stages: "information collecting" and "optimization execution". Let the target bytecode be any first bytecode in the first bytecode set. In the information collecting stage, first, the application processing device determines whether a system annotation denoted by the target bytecode is in use, that is, determines whether the class to which the target bytecode belongs has invoked the system annotation method. If the system annotation denoted by the target bytecode is in use, the application processing device further determines whether the class to which the system annotation denoted by the target bytecode belongs is an interface implementation class, or, determines, based on the inheritance relationship in the data structure, whether a parent class exists over the class to which the system annotation denoted by the target bytecode belongs. If the class to which the system annotation denoted by the target bytecode belongs is an interface implementation class, or, if a parent class exists over the class to which the system annotation denoted by the target bytecode belongs, it is determined (e.g., ascertained) that the target bytecode meets the protection condition. Therefore, the target bytecode is added to the whitelist. Evidently, the first bytecode in the whitelist meets the following conditions: (1) the system annotation denoted by the first bytecode in the whitelist is in use; and (2) a parent class exists over the class to which the system annotation denoted by the first bytecode in the whitelist belongs, or the class to which the system annotation denoted by the first bytecode in the whitelist belongs is an interface implementation class.

306. Delete, from the to-be-processed bytecode file, the first bytecode included in the first bytecode set and not included in the whitelist, so as to obtain an optimized bytecode file.

In the optimization execution stage, the application processing device deletes, from the to-be-processed bytecode file, the first bytecode included in the first bytecode set and not included in the whitelist, so as to obtain the optimized bytecode file. Understandably, the system annotation denoted by the deleted first bytecode meets the following conditions: the system annotation denoted by the deleted first bytecode is not in use, no parent class exists over the class to which the system annotation denoted by the deleted first bytecode belongs, and the class to which the system annotation denoted by the deleted bytecode belongs is not an interface implementation class.

Evidently, by performing the system annotation optimization task, the application processing device can adaptively filter out and delete, based on the protection condition, the deletable bytecode used for denoting the system annotation in the to-be-processed bytecode file, so as to obtain the optimized bytecode file. The dynamic deletion method described above enables compression of the to-be-processed bytecode file on the premise of ensuring availability and stability of the application.

307. Traverse the to-be-processed bytecode file to obtain a second bytecode.

Figure 4B:
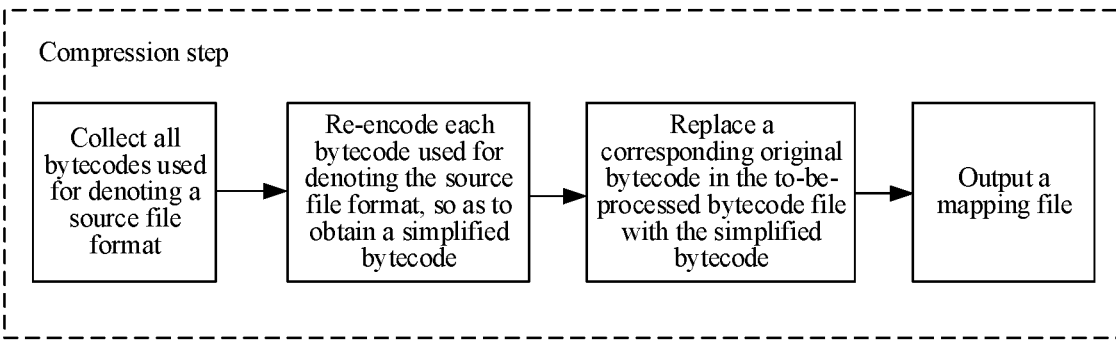
FIG. 4B is a flowchart of a source file format optimization task according to an exemplary embodiment of this application.

FIG. 4B is a flowchart of a source file format optimization task according to an exemplary embodiment of this application. As shown in FIG. 4B, first, the application processing device collects all bytecodes used for denoting source file formats, that is, traverses the to-be-processed bytecode file to obtain second bytecodes. Each second bytecode is a bytecode included in the to-be-processed bytecode file and used for denoting the source file format. The source file format is a file extension used for labeling the type of a code file (such as a java file).

308. Construct a coding tree of the second bytecode based on frequency of occurrence of the second bytecode in the to-be-processed bytecode file.

The application processing device re-encodes the bytecode used for denoting the source file format, so as to obtain a simplified bytecode. In an embodiment, the application processing device constructs a Huffman tree based on the frequency (number of times) of occurrence of the second bytecode in the to-be-processed bytecode file.

309. Encode the second bytecode based on an encoding rule of the coding tree to obtain a simplified bytecode and a mapping file.

Figure 4C:
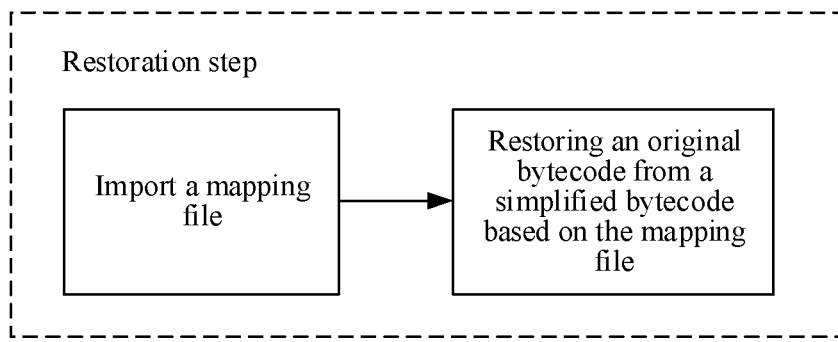
FIG. 4C is a flowchart of restoring a source file format denoted by a bytecode according to an exemplary embodiment of this application.

The mapping file is used for restoring the second bytecode from the simplified bytecode. FIG. 4C is a flowchart of restoring a source file format denoted by a bytecode according to an exemplary embodiment of this application. As shown in FIG. 4C, the application processing device imports the mapping file, and then restores an original bytecode from the simplified bytecode based on the mapping file. The original bytecode and the simplified bytecode are used for denoting the source file format.

310. Replace the second bytecode in the to-be-processed bytecode file with the simplified bytecode to obtain an optimized bytecode file.

Figure 4D:
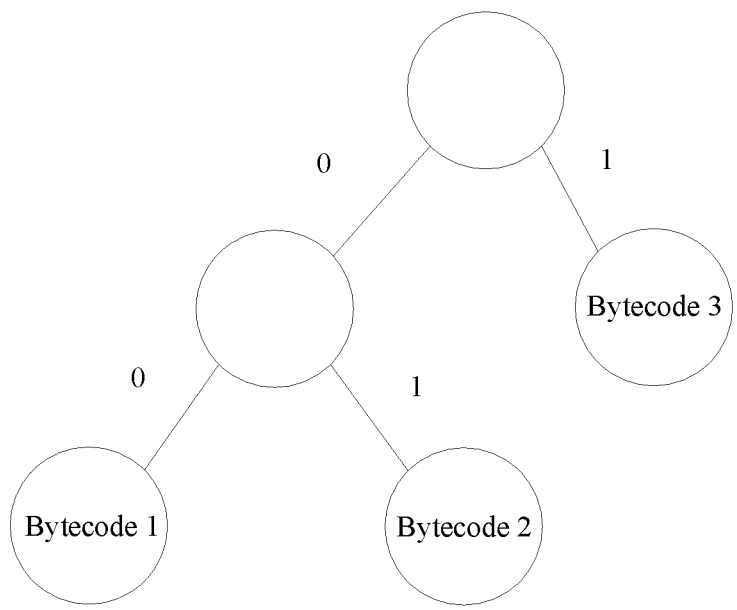
FIG. 4D is a schematic diagram of a coding tree according to an exemplary embodiment of this application.

The following describes the source file format optimization task by using a complete example. Assuming that a bytecode 1 is "XXXXXXXX", a bytecode 2 is "YYYYYYYY", and a bytecode 3 is "ZZZZZZZZ". That is, lengths of the bytecode 1 to the bytecode 3 are all 8. The number of occurrences of the bytecode 1 in the to-be-processed bytecode file is 5, the number of occurrences of the bytecode 2 in the to-be-processed bytecode file is 7, and the number of occurrences of the bytecode 3 in the to-be-processed bytecode file is 13. Therefore, a Huffman tree is constructed based on the number of occurrences of the bytecodes 1 to 3 in the to-be-processed bytecode file, as shown in FIG. 4D. Simplified bytecodes are obtained by encoding the bytecodes 1 to 3 based on coding rules of the coding tree shown in FIG. 4D. The simplified bytecode of the bytecode 1 is "00", the simplified bytecode of the bytecode 2 is "01", and the simplified bytecode of the bytecode 3 is "1". The mapping file of the bytecodes 1 to 3 is shown in Table 1.

TABLE 1

| Bytecode | Simplified bytecode |
|---|---|
| XXXXXXXX | 00 |
| YYYYYYYY | 01 |
| ZZZZZZZZ | 1 |

As can be seen from above, before simplification, a total length of the bytecodes 1 to 3 in the to-be-processed bytecode file is: $8\times(5+7+13)=200$. After simplification, the total length of the bytecodes 1 to 3 in the optimized bytecode file is: $2\times5+2\times7+1\times13=37$.

Evidently, by performing the source file format optimization task, the application processing device can compress, by using the coding tree, the bytecode used for denoting the source file format, so as to obtain the optimized bytecode file. In addition, the original bytecode can be restored from the compressed bytecode based on the mapping file.

311. Obtain optimization configuration information.

The optimization configuration information includes an identifier of to-be-optimized debugging information (for example, a package name of the debugging information, and a regular expression of the package name of the debugging information). The debugging information includes a line number and a local variable table. The debugging information retained in the to-be-processed bytecode file brings security risks to the target application. In an embodiment, the optimization configuration information of the debugging information optimization task may be pre-configured, or may be configured by a user as actually required during compression of the installation package of the target application.

312. Determine a third bytecode in the to-be-processed bytecode file based on the identifier of the to-be-optimized debugging information. The third bytecode is a bytecode used for denoting to-be-optimized debugging information.

313. Delete the third bytecode to obtain an optimized bytecode file.

Evidently, by performing the debugging information optimization task, the application processing device can dynamically delete, based on the optimization configuration information, the bytecode used for denoting the debugging information in the to-be-processed bytecode file, so as to obtain the optimized bytecode file.

314. Filter out a fourth bytecode from the to-be-processed bytecode file.

Figure 4E:
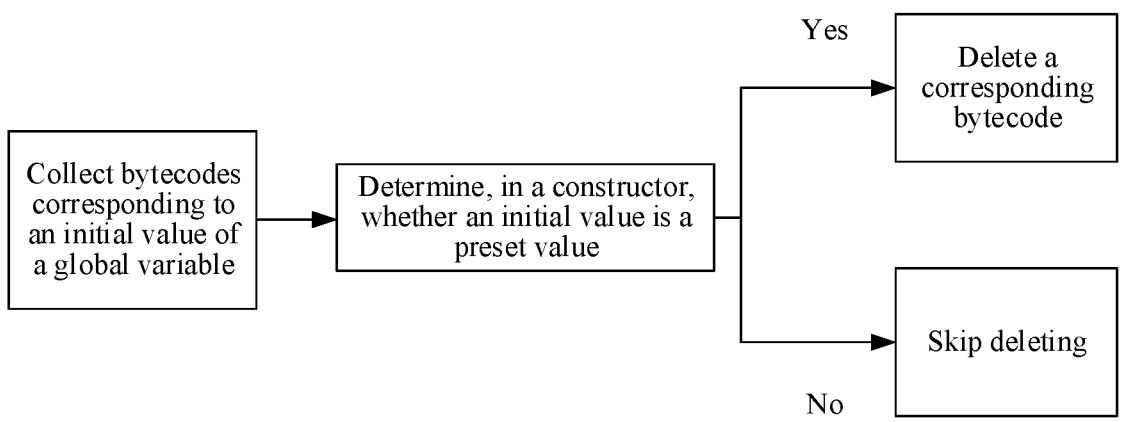
FIG. 4E is a flowchart of a global variable optimization task according to an exemplary embodiment of this application.

FIG. 4E is a flowchart of a global variable optimization task according to an exemplary embodiment of this application. As shown in FIG. 4E, first, the application processing device collects bytecodes corresponding to initial values of global variables in the to-be-processed bytecode file, so as to obtain a bytecode set that is used for denoting the initial values of the global variables. Then based on the bytecode set, the application processing device determines the initial values that correspond to the global variables respectively. Then, in a constructor, the application processing device determines whether an initial value of each global variable is a preset value, that is, filers out a fourth bytecode from the to-be-processed bytecode file. The constructor is primarily used for initializing an object in creating the object, that is, assigning an initial value to a member variable of the object. The fourth bytecode is a bytecode used for denoting the initial value of the global variable whose initial value is the preset value. In an embodiment, the fourth bytecode is a bytecode used for denoting the initial value of the global variable whose initial value is 0 (that is, the fourth bytecode is a bytecode used for denoting the initial value 0).

Table 2 shows an invalid initial value of a variable that supports automatic deletion according to an embodiment of this application.

TABLE 2

| Type | Reference type | char | double | float | long | int | Boolean |
|---|---|---|---|---|---|---|---|
| Zero value | null | '\u0000' | 0D | 0.0F | 0L | 0 | false |

Table 2 shows an invalid initial value corresponding to a global variable under various data types. When the initial value of the global variable is the same as the initial value corresponding to each data type in Table 2, the application processing device determines that the bytecode corresponding to the initial value of the global variable is the fourth bytecode. For example, assuming that a global variable a exists in the application 1 and that "int a=0", the application processing device determines that the bytecode corresponding to "0" in "int a=0" is the fourth bytecode.

315. Delete the fourth bytecode to obtain an optimized bytecode file.

Evidently, by performing the global variable optimization task, the application processing device can delete the bytecode corresponding to the invalid initial value in the to-be-processed bytecode file, so as to obtain the optimized bytecode file.

316. Traverse the to-be-processed bytecode file, and construct a data structure of the target application.

For the specific implementation of step 316, refer to the specific implementation of step 303, details of which are not repeated herein. In some embodiments, this step is skipped if the optimization tasks include a system annotation optimization task and the application processing device has constructed a data structure of the target application when performing the system annotation optimization task. Similarly, during the implementation of the system annotation optimization task, step 303 is skipped if the optimization tasks include a global variable optimization task and the application processing device has constructed a data structure of the target application when performing the global variable optimization task.

317. Read a fifth bytecode in the to-be-processed bytecode file.

Figure 4F:
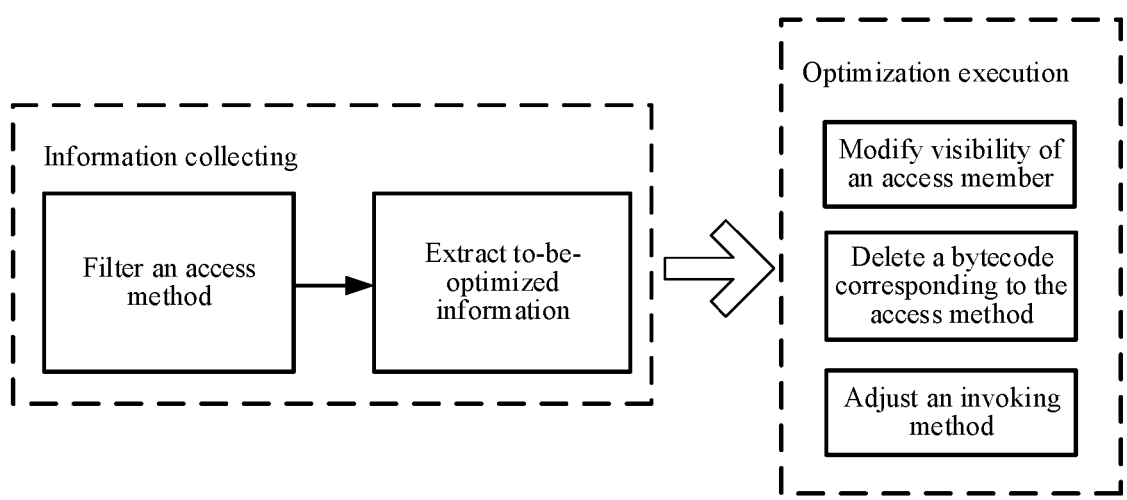
FIG. 4F is a flowchart of an access method optimization task according to an exemplary embodiment of this application.

FIG. 4F is a flowchart of an access method optimization task according to an exemplary embodiment of this application. As shown in FIG. 4F, an access method optimization task includes two stages: "information collecting" and "optimization execution". In the information collecting stage, the application processing device filters out a fifth bytecode in the to-be-processed bytecode file. The fifth bytecode is a bytecode used for denoting a target access method. The target access method may be any one access method in the target application. In an embodiment, the access method is to access by means of Access, and the access method is used for bridging a nested class and a private member so that the nested class and the private member can access each other. A nested class mentioned herein means another class defined in one class. For example, assuming that a class 1 is a class defined in a class 2, the class 1 is a nested class of the class 2. The private member means private data and functions in a class.

318. Determine to-be-optimized information based on a target access method and an inheritance relationship between classes in the data structure.

The application processing device extracts the to-be-optimized information. The to-be-optimized information includes an access member corresponding to the target access method and a method for invoking the access member. In an embodiment, the application processing device analyzes the target access method to determine the access member, and determines, based on the inheritance relationship between classes in the data structure, a method for invoking the access member.

319. Modify visibility of the access member and the method for invoking the access member.

In the optimization execution stage, the application processing device modifies the visibility of the access member. In an embodiment, the application processing device modifies the visibility of the access member from "private" to "package-visible", that is, modifies a private member to a package-visible member, and correspondingly, modifies the method for invoking the access member, that is, modifies the invoking method from "accessing by means of Access" to "accessing directly".

320. Update, based on the modification, a bytecode included in the to-be-processed bytecode file and corresponding to the method for invoking the access member, and delete the fifth bytecode to obtain an optimized bytecode file.

In an embodiment, the application processing device updates the corresponding bytecode in the to-be-processed bytecode file based on the modification in step 319, for example, modifies a bytecode used for denoting a private member corresponding to the access method, to a corresponding bytecode used for denoting a package-visible member. Then the application processing device deletes the fifth bytecode in the to-be-processed bytecode file to obtain the optimized bytecode file.

Evidently, by performing the access method optimization task, the application processing device can modify, based on the access method and the inheritance relationship between classes in the data structure, the access member corresponding to the access method, and the method for invoking the member, and delete the access method to obtain the optimized bytecode file.

According to the description of the embodiment above, considering the compression effect of bytecode file, resource consumption, and actual optimization requirements, the value of N in this implementation is 5, and the N optimization tasks include: the system annotation optimization task corresponding to step 303 to step 306, the source file format optimization task corresponding to step 307 to step 310, the debugging information optimization task corresponding to step 311 to step 313, the global variable optimization task corresponding to step 314 and step 315, and the access method optimization task corresponding to step 316 to step 320. When actually compressing the installation package of the target application, the application processing device may perform one or more of the above optimization tasks as actually required. The optimization tasks may be performed in parallel or in specified order, without being limited herein. For example, the application processing device may merely perform the global variable optimization task and the access method optimization task. The global variable optimization task may be performed in parallel with the access method optimization task, or performed after the access method optimization task. Moreover, during use of the application processing method according to this application, other optimization tasks may be added to the above five optimization tasks. For example, an R file optimization task may be added. The R file is a file used for declaring a static variable.

321. Perform a second transcoding operation on the optimized bytecode file in accordance with a determination that the optimized bytecode file meets code conventions, so as to obtain an updated class file.

In an embodiment, upon completion of each optimization task, the application processing device detects whether the optimized bytecode file meets code conventions, for example, detects whether normal access can be performed between members corresponding to the bytecodes in the optimized bytecode file. If the optimized bytecode file does not meet the code conventions, the application processing device abandons the optimization task and proceeds with other optimization tasks. If the optimized bytecode file meets the code conventions, the application processing device detects whether all the N optimization tasks are completed. If all the N optimization tasks are completed, the application processing device performs a second transcoding operation on the optimized bytecode file to obtain an updated class file. Correspondingly, if any optimization task is not completed, the application processing device continues to perform the unfinished optimization task until all the N optimization tasks are completed. The second transcoding operation is a process of converting the optimized bytecode file into an updated class file by using a compiler. The optimized bytecode file is stored in an internal memory of the application processing device in the form of bytes. The updated class file obtained from the transcoding is stored in a hard disk of the application processing device.

322. Perform an encoding operation on the updated class file to obtain an updated archive file.

In an embodiment, the application processing device encodes the updated class file to obtain an updated archive file. The application processing device creates an installation package of the target application by using the updated archive file or creates an installation package of the target application by using the updated archive file (for example, replaces the corresponding original archive file in the installation package of the target application with the updated archive file).

In some embodiments, in practical applications, the application processing method according to this embodiment of this application may be used in combination with an existing application installation package compression solution (such as a ProGuard solution). Experimental data shows that the size of the bytecode can be reduced by 12% if the bytecode of the target application is compressed by using the application processing method according to this embodiment of this application the target application is processed by using the ProGuard solution. The size of the bytecode can be reduced by 25% if the bytecode of the target application is compressed by simply using the application processing method according to this embodiment of this application.

This embodiment of this application is dedicated to optimizing the bytecode file corresponding to the archive file of the target application in a plurality of dimensions, obtaining the to-be-processed bytecode file from the archive file of the target application, and performing apposite optimization on the to-be-processed bytecode file by using five optimization tasks separately. Through the foregoing process, the bytecode file in the archive file included in the installation package of the target application is optimized appositely to a maximum extent to downsize the bytecode file, thereby helping to downsize the updated or created installation package of the target application, and achieving high compatibility and stability. In addition, the number of optimization tasks is user-definable, and additional optimization tasks can be added to keep enhancing capabilities of compressing and optimizing the bytecode file, and to further control the size of the updated or created installation package of the target application.

What is described in detail above is a method according to an embodiment of this application. For ease of implementing the foregoing solutions according to the embodiments of this application, a corresponding device according to an embodiment of this application is described below.

Figure 5:
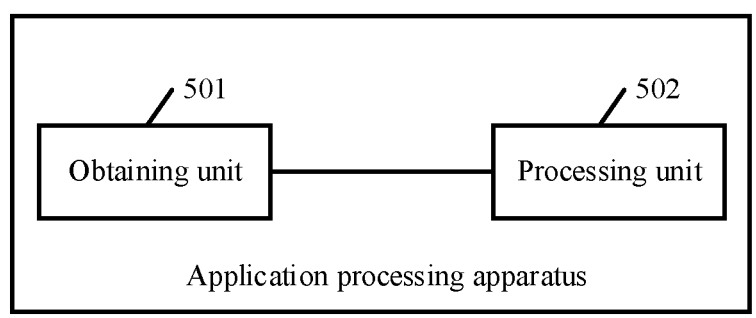
FIG. 5 is a schematic structural diagram of an application processing apparatus according to an exemplary embodiment of this application.

Referring to FIG. 5, FIG. 5 is a schematic structural diagram of an application processing apparatus according to an exemplary embodiment of this application. The application processing apparatus may be mounted on the application processing device mentioned in the foregoing method embodiment. The application processing apparatus may be a plug-in, such as a compression plug-in. The compression plug-in can be invoked to compress an application installation package during update or creation of the application installation package. Evidently, the application processing apparatus according to this embodiment of this application is universally applicable. The application processing apparatus shown in FIG. 5 may be configured to execute some or all of the functions in the method embodiments portrayed in FIG. 2 and FIG. 3. The application processing apparatus includes:

an obtaining unit 501, configured to obtain a to-be-processed bytecode file from an archive file of a target application, the archive file being used for creating or updating an installation package of the target application; and a processing unit 502, configured to traverse the to-be-processed bytecode file to collect bytecodes that correspond to N optimization tasks respectively, N being a positive integer, and one optimization task being used for optimizing one type of bytecode; and configured to perform an optimization operation on the collected bytecodes that correspond to the optimization tasks respectively, so as to obtain an optimized bytecode file.

In an embodiment, the processing unit 502 is further configured to obtain a to-be-processed bytecode file from an archive file of a target application, and is specifically configured to:

perform a decoding operation on an archive file of a target application to obtain a class file of the target application; and perform a first transcoding operation on the class file to obtain a to-be-processed bytecode file.

In an embodiment, the optimization tasks include a system annotation optimization task, and the processing unit 502 is further configured to traverse the to-be-processed bytecode file to collect bytecodes that correspond to N optimization tasks respectively, and is specifically configured to:

traverse the to-be-processed bytecode file to obtain a first bytecode set, the first bytecode set including at least one first bytecode, and the first bytecode being a bytecode used for denoting a system annotation;

add, to a whitelist, a first bytecode that meets a protection condition in the first bytecode set; and use a first bytecode in the to-be-processed bytecode file as a bytecode corresponding to the system annotation optimization task, the first bytecode being included in the first bytecode set and not included in the whitelist.

A collected bytecode corresponding to the system annotation optimization task is a first bytecode included in the first bytecode set and not included in the whitelist.

In an embodiment, letting a target bytecode be any one bytecode in the first bytecode set, the processing unit 502 is further configured to determine whether the target bytecode meets a protection condition, and is specifically configured to:

determine whether a class to which the target bytecode belongs invokes a system annotation method;

determine, in accordance with a determination that the class to which the target bytecode belongs invokes the system annotation method, whether the class to which the target bytecode belongs is an interface implementation class, or, determine, based on an inheritance relationship in a data structure of the target application, whether a parent class exists over the class to which the target bytecode belongs, the data structure including an inheritance relationship of each class in the target application; and in accordance with a determination that the class to which the target bytecode belongs is an interface implementation class or in accordance with a determination that a parent class exists over the class to which the target bytecode belongs, determine (e.g., ascertain) that the target bytecode meets the protection condition.

In an embodiment, the processing unit 502 is further configured to perform an optimization operation on the collected bytecodes that correspond to the optimization tasks respectively, so as to obtain an optimized bytecode file, and is specifically configured to:

delete, from the to-be-processed bytecode file, the first bytecode included in the first bytecode set and not included in the whitelist, so as to obtain an optimized bytecode file.

In an embodiment, the optimization tasks include a source file format optimization task. A collected bytecode corresponding to the source file format optimization task is a second bytecode in the to-be-processed bytecode file. The second bytecode is a bytecode used for denoting a source file format. The processing unit 502 is further configured to perform an optimization operation on the collected bytecodes that correspond to the optimization tasks respectively, so as to obtain an optimized bytecode file, and is specifically configured to:

construct a coding tree of the second bytecode based on frequency of occurrence of the second bytecode in the to-be-processed bytecode file;

encode the second bytecode based on an encoding rule of the coding tree to obtain a simplified bytecode and a mapping file; and replace the second bytecode in the to-be-processed bytecode file with the simplified bytecode to obtain an optimized bytecode file.

The second bytecode can be restored from the simplified bytecode based on the mapping file.

In an embodiment, the optimization tasks include a debugging information optimization task, and the processing unit 502 is further configured to traverse the to-be-processed bytecode file to collect bytecodes that correspond to N optimization tasks respectively, and is specifically configured to:

obtain optimization configuration information, the optimization configuration information including an identifier of to-be-optimized debugging information; and determine a third bytecode in the to-be-processed bytecode file based on the identifier of the to-be-optimized debugging information, the third bytecode being a bytecode used for denoting the to-be-optimized debugging information.

The processing unit 502 is further configured to perform an optimization operation on the collected bytecodes that correspond to the optimization tasks respectively, so as to obtain an optimized bytecode file, and is specifically configured to:

delete the third bytecode to obtain an optimized bytecode file.

In an embodiment, the optimization tasks include a global variable optimization task, and the processing unit 502 is further configured to traverse the to-be-processed bytecode file to collect bytecodes that correspond to N optimization tasks respectively, and is specifically configured to:

filter out a fourth bytecode from the to-be-processed bytecode file, the fourth bytecode being a bytecode used for denoting an initial value of a global variable whose initial value is a preset value.

In an embodiment, the processing unit 502 is further configured to perform an optimization operation on the collected bytecodes that correspond to the optimization tasks respectively, so as to obtain an optimized bytecode file, and is specifically configured to:

delete the fourth bytecode to obtain an optimized bytecode file.

In an embodiment, the optimization tasks include an access method optimization task, and the processing unit 502 is further configured to traverse the to-be-processed bytecode file to collect bytecodes that correspond to N optimization tasks respectively, and is specifically configured to:

read a fifth bytecode in the to-be-processed bytecode file, the fifth bytecode being a bytecode used for denoting a target access method, and the target access method being any one access method in the target application; and determine to-be-optimized information based on the target access method and an inheritance relationship of each class in a data structure, the to-be-optimized information including an access member corresponding to the target access method and a method for invoking the access member.

In an embodiment, the processing unit 502 is further configured to perform an optimization operation on the collected bytecodes that correspond to the optimization tasks respectively, so as to obtain an optimized bytecode file, and is specifically configured to:

modify visibility of the access member and the method for invoking the access member; and update, based on the modification, a bytecode included in the to-be-processed bytecode file and corresponding to the method for invoking the access member, and delete the fifth bytecode to obtain an optimized bytecode file.

In an embodiment, the processing unit 502 is further configured to:

perform a second transcoding operation on the optimized bytecode file in accordance with a determination that the optimized bytecode file meets code conventions, so as to obtain an updated class file; and perform an encoding operation on the updated class file to obtain an updated archive file.

According to an embodiment of this application, some of the steps in the application processing method shown in FIG. 2 and FIG. 3 may be performed by the units in the application processing apparatus shown in FIG. 5. For example, step 201 shown in FIG. 2 may be performed by the obtaining unit 501 shown in FIG. 5, and step 202 and step 203 may be performed by the processing unit 502 shown in FIG. 5. Step 304, step 307, and step 311 shown in FIG. 3 may be performed by the obtaining unit 501 shown in FIG. 5. Steps 301 to 303, step 305, step 306, steps 308 to 310, and steps 312 to 322 may be performed by the processing unit 502 shown in FIG. 5. The units in the application processing apparatus shown in FIG. 5 may be combined into one or several other units separately or altogether, or one or more of such units may be divided into a plurality of functionally smaller units. Such units can implement equivalent operations without affecting the achievement of technical effects of the embodiments of this application. Division into such units is implemented based on logical functions. In practical applications, the functions of one unit may be implemented by a plurality of units instead, or the functions of a plurality of units may be implemented by one unit. In other embodiments of this application, the application processing apparatus may further include other units. In practical applications, the functions may be implemented under assistance of other units, and may be implemented by a plurality of units cooperatively.

According to another embodiment of this application, a general-purpose computing apparatus such as a computer, which includes processing and storage components such as a central processing unit (CPU), a random access memory (RAM), or a read-only memory (ROM), may run a computer program (including program code) capable of performing the steps of the corresponding methods shown in FIG. 2 and FIG. 3, to implement the application processing apparatus shown in FIG. 5 and implement the application processing method according to the embodiments of this application. The computer program may be stored in, for example, a computer-readable storage medium, and loaded and run in the computing apparatus through the computer-readable storage medium.

Based on the same inventive concept, the application processing apparatus according to the embodiments of this application solves problems based on the same principles and exerts the same beneficial effects as the application processing method according to the method embodiments of this application. For details, refer to the implementation principles and the beneficial effects of the method embodiments. The details are omitted herein for brevity.

Figure 6:
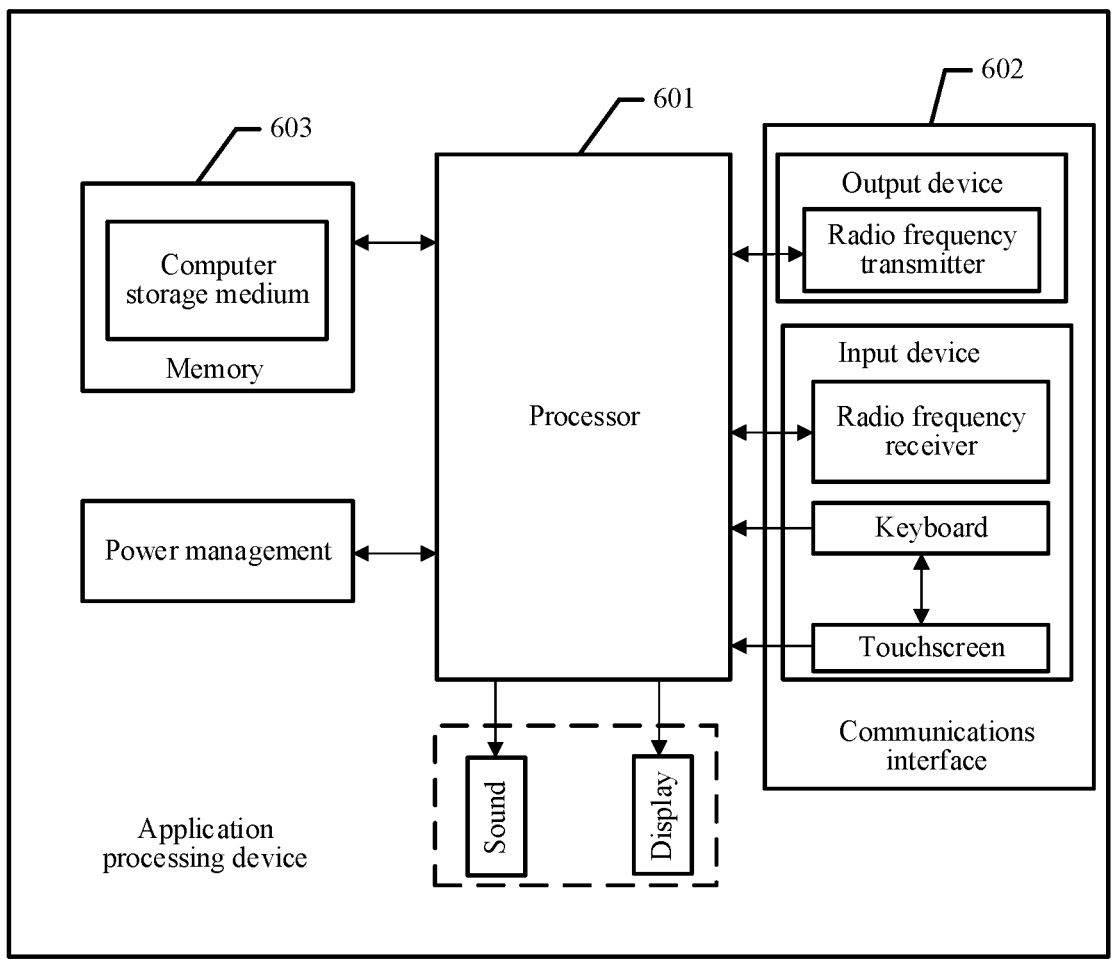
FIG. 6 is a schematic structural diagram of an application processing device according to an exemplary embodiment of this application.

Referring to FIG. 6, FIG. 6 is a schematic structural diagram of an application processing device according to an exemplary embodiment of this application. The application processing device may be a terminal device or a server. The application processing device includes at least a processor 601, a communications interface 602, and a memory 603. The processor 601, the communications interface 602, and the memory 603 may be connected by a bus or by other means, and, as an example in this embodiment of this application, connected by a bus. The processor 601 (or central processing unit (CPU)) is a computing core and a control core of the application processing device, and can parse various instructions in the terminal device and process various data of the terminal device. For example, the CPU can be configured to parse power-on/off instructions issued by a user to the terminal device, and control the terminal device to perform power-on/off operations. For another example, the CPU can transmit various interaction data between internal structures of the terminal device, and so on. The communications interface 602 may include a standard wired interface, a wireless interface (such as Wi-Fi and a mobile communications interface), and may be configured to transmit and receive data under the control of the processor 601. The communications interface 602 may be further configured to transmit and exchange internal data of the terminal device. The memory 603 is a memory device in the terminal device, and is configured to store programs and data. Understandably, the memory 603 herein may include both a built-in memory of the terminal device and extension memories supported by the terminal device. The memory 603 provides storage space. The storage space stores an operating system of the terminal device, including but not limited to an Android system, an iOS system, and a Windows Phone system, without being limited herein.

In an embodiment, the application processing device may be a terminal device or a server. In this case, the processor 601 performs the following operations by running executable program code in the memory 603:

obtaining a to-be-processed bytecode file from an archive file of a target application through a communications interface 602, the archive file being used for creating or updating an installation package of the target application; and traversing the to-be-processed bytecode file to collect bytecodes that correspond to N optimization tasks respectively, N being a positive integer, and one optimization task being used for optimizing one type of bytecode; and performing an optimization operation on the collected bytecodes that correspond to the optimization tasks respectively, so as to obtain an optimized bytecode file.

In an embodiment, the processor 601 obtains the to-be-processed bytecode file from the archive file of the target application specifically by:

performing a decoding operation on an archive file of a target application to obtain a class file of the target application; and performing a first transcoding operation on the class file to obtain a to-be-processed bytecode file.

In an embodiment, the optimization tasks include a system annotation optimization task, and the processor 601 traverses the to-be-processed bytecode file to collect bytecodes that correspond to N optimization tasks respectively. The traversing is specifically implemented by:

traversing the to-be-processed bytecode file to obtain a first bytecode set, the first bytecode set including at least one first bytecode, and the first bytecode being a bytecode used for denoting a system annotation;

adding, to a whitelist, a first bytecode that meets a protection condition in the first bytecode set; and using a first bytecode in the to-be-processed bytecode file as a bytecode corresponding to the system annotation optimization task, the first bytecode being included in the first bytecode set and not included in the whitelist.

A collected bytecode corresponding to the system annotation optimization task is a first bytecode included in the first bytecode set and not included in the whitelist.

In an embodiment, letting a target bytecode be any one bytecode in the first bytecode set, the processor 601 further performs the following operations by running executable program code in the memory 603:

determining whether a class to which the target bytecode belongs invokes a system annotation method;

determining, in accordance with a determination that the class to which the target bytecode belongs invokes the system annotation method, whether the class to which the target bytecode belongs is an interface implementation class, or, determining, based on an inheritance relationship in a data structure of the target application, whether a parent class exists over the class to which the target bytecode belongs, the data structure including an inheritance relationship of each class in the target application; and determining, in accordance with a determination that the class to which the target bytecode belongs is an interface implementation class or in accordance with a determination that a parent class exists over the class to which the target bytecode belongs, that the target bytecode meets the protection condition.

In an embodiment, the processor 601 performs an optimization operation on the collected bytecodes that correspond to the optimization tasks respectively, so as to obtain an optimized bytecode file. The optimization operation is specifically implemented by:

deleting, from the to-be-processed bytecode file, the first bytecode included in the first bytecode set and not included in the whitelist, so as to obtain an optimized bytecode file.

In an embodiment, the optimization tasks include a source file format optimization task. A collected bytecode corresponding to the source file format optimization task is a second bytecode in the to-be-processed bytecode file. The second bytecode is a bytecode used for denoting a source file format. The processor 601 performs an optimization operation on the collected bytecodes that correspond to the optimization tasks respectively, so as to obtain an optimized bytecode file. The optimization operation is specifically implemented by:

constructing a coding tree of the second bytecode based on frequency of occurrence of the second bytecode in the to-be-processed bytecode file;

encoding the second bytecode based on an encoding rule of the coding tree to obtain a simplified bytecode and a mapping file; and replacing the second bytecode in the to-be-processed bytecode file with the simplified bytecode to obtain an optimized bytecode file.

The second bytecode can be restored from the simplified bytecode based on the mapping file.

In an embodiment, the optimization tasks include a debugging information optimization task, and the processor 601 traverses the to-be-processed bytecode file to collect bytecodes that correspond to N optimization tasks respectively. The traversing is specifically implemented by:

obtaining optimization configuration information, the optimization configuration information including an identifier of to-be-optimized debugging information; and determining a third bytecode in the to-be-processed bytecode file based on the identifier of the to-be-optimized debugging information, the third bytecode being a bytecode used for denoting the to-be-optimized debugging information.

The processor 601 performs an optimization operation on the collected bytecodes that correspond to the optimization tasks respectively, so as to obtain an optimized bytecode file. The optimization operation is specifically implemented by:

deleting the third bytecode to obtain an optimized bytecode file.

In an embodiment, the optimization tasks include a global variable optimization task, and the processor 601 traverses the to-be-processed bytecode file to collect bytecodes that correspond to N optimization tasks respectively. The traversing is specifically implemented by:

filtering out a fourth bytecode from the to-be-processed bytecode file, the fourth bytecode being a bytecode used for denoting an initial value of a global variable whose initial value is a preset value.

In an embodiment, the processor 601 performs an optimization operation on the collected bytecodes that correspond to the optimization tasks respectively, so as to obtain an optimized bytecode file. The optimization operation is specifically implemented by:

deleting the fourth bytecode to obtain an optimized bytecode file.

In an embodiment, the optimization tasks include an access method optimization task, and the processor 601 traverses the to-be-processed bytecode file to collect bytecodes that correspond to N optimization tasks respectively. The traversing is specifically implemented by:

reading a fifth bytecode in the to-be-processed bytecode file, the fifth bytecode being a bytecode used for denoting a target access method, and the target access method being any one access method in the target application; and determining to-be-optimized information based on the target access method and an inheritance relationship of each class in a data structure, the to-be-optimized information including an access member corresponding to the target access method and a method for invoking the access member.

In an embodiment, the processor 601 performs an optimization operation on the collected bytecodes that correspond to the optimization tasks respectively, so as to obtain an optimized bytecode file. The optimization operation is specifically implemented by:

modifying visibility of the access member and the method for invoking the access member; and updating, based on the modification, a bytecode included in the to-be-processed bytecode file and corresponding to the method for invoking the access member, and deleting the fifth bytecode to obtain an optimized bytecode file.

In an embodiment, the processor 601 further performs the following operations by running executable program code in the memory 603:

performing a second transcoding operation on the optimized bytecode file in accordance with a determination that the optimized bytecode file meets code conventions, so as to obtain an updated class file; and performing an encoding operation on the updated class file to obtain an updated archive file.

Based on the same inventive concept, the application processing device according to the embodiments of this application solves problems based on the same principles and exerts the same beneficial effects as the application processing method according to the method embodiments of this application. For details, refer to the implementation principles and the beneficial effects of the method embodiments. The details are omitted herein for brevity.

An embodiment of this application further provides a non-transitory computer-readable storage medium. The computer-readable storage medium stores a computer program. The computer program is configured to be loaded by a processor to implement the application processing method disclosed in the foregoing method embodiments.

An embodiment of this application further provides a computer program product or a computer program. The computer program product or the computer program includes a computer instruction. The computer instruction is stored in a computer-readable storage medium. A processor of a computer device reads the computer instruction in the computer-readable storage medium. The processor executes the computer instruction to cause the computer device to perform the application processing method described above.

For ease of description, the foregoing method embodiments are described as a combination of a series of operations. However, a person skilled in the art understands that this application is not limited by the mentioned order of operations because some steps according to this application may occur in other order or in parallel. In addition, a person skilled in the art understands that the operations and modules mentioned in the embodiments described herein are not necessarily required by this application.

The steps of the method in the embodiments of this application may be rearranged, combined, or trimmed as actually required.

The modules of the apparatus in the embodiments of this application may be combined, rearranged, or trimmed as actually required.

A person of ordinary skill in the art understands that all or part of the steps of various methods in the foregoing embodiments may be implemented by relevant hardware instructed by a program. The program may be stored in a computer-readable storage medium. The readable storage medium may include: a flash disk, a read-only memory (ROM), a random access device (RAM), a magnetic disk, an optical disk, or the like.

What is disclosed above is merely exemplary embodiments of this application, and in no way constitutes a limitation on the protection scope of this application. A person of ordinary skill in the art understands that any complete or partial implementation of the foregoing embodiments and any equivalent variations made based on the claims of this application still fall within the scope covered by this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs information processing and/or optimization execution. In practical application, the foregoing functions may be allocated to and completed by different functional modules according to requirements, that is, an inner structure of a device is divided into different functional modules to implement all or a part of the functions described above.

What is claimed is:

1. An application processing method, comprising:
   obtaining a to-be-processed bytecode file from an archive file of a target application, the archive file being used for creating or updating an installation package of the target application;
   traversing the to-be-processed bytecode file to collect bytecodes that correspond to N optimization tasks respectively, N being a positive integer, and one optimization task being used for optimizing one type of bytecode, further comprising:
   traversing the to-be-processed bytecode file to obtain a first bytecode set, the first bytecode set comprising one or more bytecodes, the one or more bytecodes being used for denoting a system annotation, and
   adding, to a whitelist, bytecodes of the one or more bytecodes that meet a protection condition in the first bytecode set;
   performing an optimization operation on the collected bytecodes that correspond to the optimization tasks respectively, so as to obtain an optimized bytecode file, further comprising:
   deleting, from the to-be-processed bytecode file, a first bytecode comprised in the first bytecode set and not comprised in the whitelist; and
   obtaining an updated archive file based on the optimized bytecode file, the updated archive file being used for creating or updating the installation package of the target application.

2. The method according to claim 1, wherein obtaining the to-be-processed bytecode file comprises:
   performing a decoding operation on the archive file of the target application to obtain a class file of the target application; and
   performing a first transcoding operation on the class file to obtain the to-be-processed bytecode file.

3. The method according to claim 2, further comprising:
   performing a second transcoding operation on the optimized bytecode file in accordance with a determination that the optimized bytecode file meets code conventions, so as to obtain an updated class file; and
   performing an encoding operation on the updated class file to obtain the updated archive file.

4. The method according to claim 1, wherein the N optimization tasks comprise a system annotation optimization task, and a collected bytecode corresponding to the system annotation optimization task is comprised in the first bytecode set and not comprised in the whitelist.

5. The method according to claim 4, further comprising:
   designating a target bytecode as any one bytecode in the first bytecode set;
   determining whether a class to which the target bytecode belongs invokes a system annotation method;
   in accordance with a determination that the class to which the target bytecode belongs invokes the system annotation method:
   determining whether the class to which the target bytecode belongs is an interface implementation class; or
   determining, based on an inheritance relationship in a data structure of the target application, whether a parent class exists over the class to which the target bytecode belongs, the data structure comprising an inheritance relationship of each class in the target application; and
   in accordance with a determination that the class to which the target bytecode belongs is an interface implementation class or in a case that a parent class exists over the class to which the target bytecode belongs, ascertaining that the target bytecode meets the protection condition.

6. The method according to claim 1, wherein the N optimization tasks comprise a source file format optimization task; a collected bytecode corresponding to the source file format optimization task is a second bytecode in the to-be-processed bytecode file, the second bytecode being a bytecode used for denoting a source file format; and
  performing the optimization operation comprises:
    creating a coding tree of the second bytecode based on frequency of occurrence of the second bytecode in the to-be-processed bytecode file;
    encoding the second bytecode based on an encoding rule of the coding tree to obtain a simplified bytecode and a mapping file; and
    replacing the second bytecode in the to-be-processed bytecode file with the simplified bytecode to obtain an optimized bytecode file, wherein:
      the second bytecode is restorable from the simplified bytecode based on the mapping file.

7. The method according to claim 1, wherein the N optimization tasks comprise a debugging information optimization task, and traversing the to-be-processed bytecode file comprises:
  obtaining optimization configuration information, the optimization configuration information comprising an identifier of to-be-optimized debugging information;
  determining a third bytecode in the to-be-processed bytecode file based on the identifier of the to-be-optimized debugging information, the third bytecode being a bytecode used for denoting the to-be-optimized debugging information; and
  performing the optimization operation on the collected bytecodes that correspond to the N optimization tasks respectively, so as to obtain an optimized bytecode file, comprises:
    deleting the third bytecode to obtain the optimized bytecode file.

8. The method according to claim 1, wherein the N optimization tasks comprise a global variable optimization task, and traversing the to-be-processed bytecode file to collect bytecodes that correspond to the N optimization tasks respectively comprises:
  filtering out a fourth bytecode from the to-be-processed bytecode file, the fourth bytecode being a bytecode used for denoting an initial value of a global variable whose initial value is a preset value.

9. The method according to claim 8, wherein performing the optimization operation on the collected bytecodes comprises:
  deleting the fourth bytecode to obtain the optimized bytecode file.

10. The method according to claim 1, wherein the N optimization tasks comprise an access method optimization task, and traversing the to-be-processed bytecode file to collect bytecodes that correspond to the N optimization tasks respectively comprises:
  reading a fifth bytecode in the to-be-processed bytecode file, the fifth bytecode being a bytecode used for denoting a target access method, and the target access method being any one access method in the target application; and
  determining to-be-optimized information based on the target access method and an inheritance relationship of each class in a data structure, the to-be-optimized information comprising an access member corresponding to the target access method and a method for invoking the access member.

11. The method according to claim 10, wherein the performing the optimization operation on the collected bytecodes comprises:
  modifying visibility of the access member and the method for invoking the access member; and
  updating, based on the modification, a bytecode comprised in the to-be-processed bytecode file and corresponding to the method for invoking the access member, and deleting the fifth bytecode to obtain the optimized bytecode file.

12. A computer system, comprising:
one or more processors; and
memory storing one or more programs, the one or more programs comprising instructions that, when executed by the one or more processors, cause the one or more processors to perform operations comprising:
  obtaining a to-be-processed bytecode file from an archive file of a target application, the archive file being used for creating or updating an installation package of the target application;
  traversing the to-be-processed bytecode file to collect bytecodes that correspond to N optimization tasks respectively, N being a positive integer, and one optimization task being used for optimizing one type of bytecode, further comprising:
    traversing the to-be-processed bytecode file to obtain a first bytecode set, the first bytecode set comprising one or more bytecodes, the one or more bytecodes being used for denoting a system annotation, and
    adding, to a whitelist, bytecodes of the one or more bytecodes that meet a protection condition in the first bytecode set;
  performing an optimization operation on the collected bytecodes that correspond to the optimization tasks respectively, so as to obtain an optimized bytecode file, further comprising:
    deleting, from the to-be-processed bytecode file, a first bytecode comprised in the first bytecode set and not comprised in the whitelist; and
  obtaining an updated archive file based on the optimized bytecode file, the updated archive file being used for creating or updating the installation package of the target application.

13. The computer system according to claim 12, wherein obtaining the to-be-processed bytecode file comprises:
  performing a decoding operation on the archive file of the target application to obtain a class file of the target application; and
  performing a first transcoding operation on the class file to obtain the to-be-processed bytecode file.

14. The computer system according to claim 12, wherein the N optimization tasks comprise a system annotation optimization task, and a collected bytecode corresponding to the system annotation optimization task is comprised in the first bytecode set and not comprised in the whitelist.

15. The computer system according to claim 14, further comprising:
  designating a target bytecode as any one bytecode in the first bytecode set;
  determining whether a class to which the target bytecode belongs invokes a system annotation method;
  in accordance with a determination that the class to which the target bytecode belongs invokes the system annotation method:
    determining whether the class to which the target bytecode belongs is an interface implementation class; or
    determining, based on an inheritance relationship in a data structure of the target application, whether a parent class exists over the class to which the target bytecode belongs, the data structure comprising an inheritance relationship of each class in the target application; and in accordance with a determination that the class to which the target bytecode belongs is an interface implementation class or in a case that a parent class exists over the class to which the target bytecode belongs, ascertaining that the target bytecode meets the protection condition.

16. A non-transitory computer-readable storage medium, storing a computer program, the computer program, when executed by one or more processors of a computer system, cause the one or more processors to perform operations comprising:

obtaining a to-be-processed bytecode file from an archive file of a target application, the archive file being used for creating or updating an installation package of the target application;

traversing the to-be-processed bytecode file to collect bytecodes that correspond to N optimization tasks respectively, N being a positive integer, and one optimization task being used for optimizing one type of bytecode, further comprising:
  traversing the to-be-processed bytecode file to obtain a first bytecode set, the first bytecode set comprising one or more bytecodes, the one or more bytecodes being used for denoting a system annotation, and
  adding, to a whitelist, bytecodes of the one or more bytecodes that meet a protection condition in the first bytecode set;

performing an optimization operation on the collected bytecodes that correspond to the optimization tasks respectively, so as to obtain an optimized bytecode file, further comprising:
  deleting, from the to-be-processed bytecode file, a first bytecode comprised in the first bytecode set and not comprised in the whitelist; and obtaining an updated archive file based on the optimized bytecode file, the updated archive file being used for creating or updating the installation package of the target application.

17. The non-transitory computer-readable storage medium according to claim 16, wherein the N optimization tasks comprise a source file format optimization task; and a collected bytecode corresponding to the source file format optimization task is a second bytecode in the to-be-processed bytecode file, the second bytecode being a bytecode used for denoting a source file format; and performing the optimization operation comprises:
  creating a coding tree of the second bytecode based on frequency of occurrence of the second bytecode in the to-be-processed bytecode file;
  encoding the second bytecode based on an encoding rule of the coding tree to obtain a simplified bytecode and a mapping file; and
  replacing the second bytecode in the to-be-processed bytecode file with the simplified bytecode to obtain an optimized bytecode file, wherein:
    the second bytecode is restorable from the simplified bytecode based on the mapping file.

18. The non-transitory computer-readable storage medium according to claim 16, wherein the N optimization tasks comprise a debugging information optimization task, and traversing the to-be-processed bytecode file comprises:
  obtaining optimization configuration information, the optimization configuration information comprising an identifier of to-be-optimized debugging information;
  determining a third bytecode in the to-be-processed bytecode file based on the identifier of the to-be-optimized debugging information, the third bytecode being a bytecode used for denoting the to-be-optimized debugging information; and
performing the optimization operation on the collected bytecodes that correspond to the N optimization tasks respectively, so as to obtain an optimized bytecode file, comprises:
deleting the third bytecode to obtain the optimized bytecode file.

* * * * *